(12) United States Patent
Haneda et al.

(10) Patent No.: US 10,737,611 B2
(45) Date of Patent: Aug. 11, 2020

(54) ROAD SURFACE DISPLAY DEVICE

(71) Applicant: DENSO CORPORATION, Kariya, Aichi-pref. (JP)

(72) Inventors: Narihiro Haneda, Kariya (JP); Kunihiko Hayashi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 134 days.

(21) Appl. No.: 15/577,451

(22) PCT Filed: May 10, 2016

(86) PCT No.: PCT/JP2016/002291
§ 371 (c)(1),
(2) Date: Nov. 28, 2017

(87) PCT Pub. No.: WO2016/199345
PCT Pub. Date: Dec. 15, 2016

(65) Prior Publication Data
US 2018/0141484 A1    May 24, 2018

(30) Foreign Application Priority Data

Jun. 9, 2015  (JP) ................................. 2015-116670

(51) Int. Cl.
*B60Q 1/26* (2006.01)
*G06K 9/00* (2006.01)
(Continued)

(52) U.S. Cl.
CPC ............ *B60Q 1/2615* (2013.01); *B60Q 1/44* (2013.01); *B60Q 1/50* (2013.01); *B60Q 1/525* (2013.01);
(Continued)

(58) Field of Classification Search
CPC .......... B60Q 1/2615; B60Q 1/44; B60Q 1/50; B60Q 1/525; B60Q 2400/50; B60Q 1/06;
(Continued)

(56) References Cited

FOREIGN PATENT DOCUMENTS

| JP | 2004220257 A | 8/2004 |
|----|--------------|--------|
| JP | 2006096326 A | 4/2006 |

(Continued)

OTHER PUBLICATIONS

Kenji Konno et al., "Laser Scan Ultra Compact Projector", Konica Minolta Technology Report, vol. 7, 2010, pp. 130-133.
(Continued)

*Primary Examiner* — Anthony R Jimenez

(57) ABSTRACT

A road surface display device mounted to an own vehicle includes: a road surface image control portion generating a road surface image which is displayed on a road surface ahead of the own vehicle and includes images each indicating an expected arrival zone where the own vehicle is expected to arrive at an expected arrival time; a detection portion obtaining display states of a different vehicle image, which is a road surface image displayed by a different vehicle, and an own vehicle image, which is the road surface image displayed by the own vehicle, and detecting a presence of overlapping or proximity between the two images; and a display adjustment portion, when the presence of overlapping or proximity is detected, displaying an image indicating a shorter expected arrival time in a region where the presence of overlapping or proximity is detected on the road surface.

5 Claims, 7 Drawing Sheets

(51) Int. Cl.
  *G08G 1/16* (2006.01)
  *B60Q 1/52* (2006.01)
  *B60Q 1/44* (2006.01)
  *B60Q 1/50* (2006.01)
  *B62D 6/00* (2006.01)

(52) U.S. Cl.
  CPC .......... *G06K 9/00791* (2013.01); *G08G 1/16* (2013.01); *G08G 1/166* (2013.01); *B60Q 2400/50* (2013.01); *B62D 6/00* (2013.01)

(58) Field of Classification Search
  CPC ...... B60Q 1/24; B60Q 9/008; G06K 9/00791; G08G 1/16; G08G 1/166; G08G 1/005; G08G 1/161; B62D 6/00; B60K 35/00; B60K 2350/1084; B60K 2350/2052; B60K 2350/924; B60K 2370/5915; B60K 2370/175; B60K 2370/334; B60K 2370/797; B60K 2370/178; B60K 2370/179

USPC ....................................................... 701/301
  See application file for complete search history.

(56) References Cited

FOREIGN PATENT DOCUMENTS

| | | |
|---|---|---|
| JP | 2007008280 A | 1/2007 |
| JP | 2009248598 A | 10/2009 |

OTHER PUBLICATIONS

Yasuo Tanahashi et al., "Development of Full-Color Laser Head-UP Display", Pioneer R&D, vol. 22, 2013, pp. 1-7.
Eiichi Iyono et al., "P401LC LCD Rear Projector", Toshiba Review, vol. 55, No. 2, 2000, pp. 7-11.
Kiyoshi Takahashi, "P410DL DLP System Video Wall Projector", Toshiba Review, vol. 55, No. 2, 2000, pp. 12-16.

ROAD SURFACE DISPLAY DEVICE

CROSS REFERENCE TO RELATED APPLICATIONS

This application is a U.S. National Phase Application under 35 U.S.C. 371 of International Application No. PCT/JP2016/002291 filed on May 10, 2016 and published in Japanese as WO 2016/199345 A1 on Dec. 15, 2016. This application is based on and claims the benefit of priority from Japanese Patent Application No. 2015-116670 filed on Jun. 9, 2015. The entire disclosures of all of the above applications are incorporated herein by reference.

TECHNICAL FIELD

The present disclosure relates to a road surface display device mounted to a vehicle and displaying an image on a road surface.

BACKGROUND ART

A road surface display device in the related art displays an image (road surface image) showing a range at which a vehicle is expected to arrive when a predetermined expected arrival time elapses, namely an expected arrival zone, on a road surface the vehicle is traveling. Patent Literature 1 discloses a technique to display a road surface image showing expected arrival zones on the road surface in different colors according to multiple expected arrival time points.

PRIOR ART LITERATURE

Patent Literature

Patent Literature 1: JP 2006-96326 A

SUMMARY OF INVENTION

According to the technique described in Patent Literature 1, when a road surface image projected by another vehicle overlaps a road surface image projected by an own vehicle, a display color of the road surface image projected by the own vehicle and a display color of the road surface image projected by another vehicle may be mixed, in which case a mixed color is displayed on the road surface. Also, when an own vehicle and another vehicle coming in an opposite direction are present in a narrow road and a road surface image projected by another vehicle is in close proximity to a road surface image projected by the own vehicle, that is, when road surface images projected by multiple vehicles are displayed on the road surface, road surface images projected by multiple vehicles may be visible to a pedestrian.

Road surface images overlapping each other or in close proximity to each other as above confuse a pedestrian who is trying to determine a safety level of the road according to the road surface images, for example, before crossing the road. That is, the technique described in Patent Literature 1 has a difficulty that when multiple road surface images indicating different safety levels are displayed on a road surface, a viewer who sees the road surface images has a difficulty in correctly determining a safety level of the road according to the displayed road surface images.

In view of the foregoing difficulties, it is an object of the present disclosure to provide a road surface display device which enables a viewer who sees road surface images to correctly determine a safety level of a road on which the road surface images are displayed.

According to an aspect of the present disclosure, a road surface display, which is mounted to an own vehicle and displays an image on a road surface, includes a road surface image control portion, a detection portion, and a display adjustment portion. The road surface image control portion generates a road surface image including sub images. Each of the sub images indicates an expected arrival zone where the own vehicle is expected to arrive at a corresponding predetermined expected arrival time, and the sub images are arranged according to the respective expected arrival times. The road surface image control portion displays the road surface image on a road surface ahead of the own vehicle in a travel direction. The detection portion obtains display states of a different vehicle image and an own vehicle image when the different vehicle image and the own vehicle image are displayed on the road surface. The different vehicle image is a road surface image displayed by a different vehicle equipped with the road surface display device, and the own vehicle image is the road surface image displayed by the own vehicle. The detection portion detects a presence of overlapping or a presence of proximity between the different vehicle image and the own vehicle image based on the obtained display states. The display adjustment portion, when the presence of overlapping or the presence of proximity is detected by the detection portion, adjusts an output of the road surface image control portion to display one of the different vehicle image or the own vehicle image which indicates a shorter expected arrival time in a region where the presence of overlapping or the presence of proximity is detected on the road surface.

According to the configuration as above, a road surface image including multiple images specifying expected arrival zones at which the own vehicle is expected to arrive when respective predetermined expected arrival durations elapse and generated according to the expected arrival time points is displayed on the road surface. When a road surface image projected by another vehicle overlaps with or is in close proximity to a road surface image projected by the own vehicle, one of the road surface images indicating the shorter expected arrival time is displayed.

Hence, only one type of the road surface image indicating a clear safety level is displayed on the road surface. Thus, a viewer who sees the road surface can correctly determine a safety level of the road according to the displayed road surface image.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

Hereinafter, embodiments to which the present disclosure is applied will be described with reference to the drawings.

Figure 1:
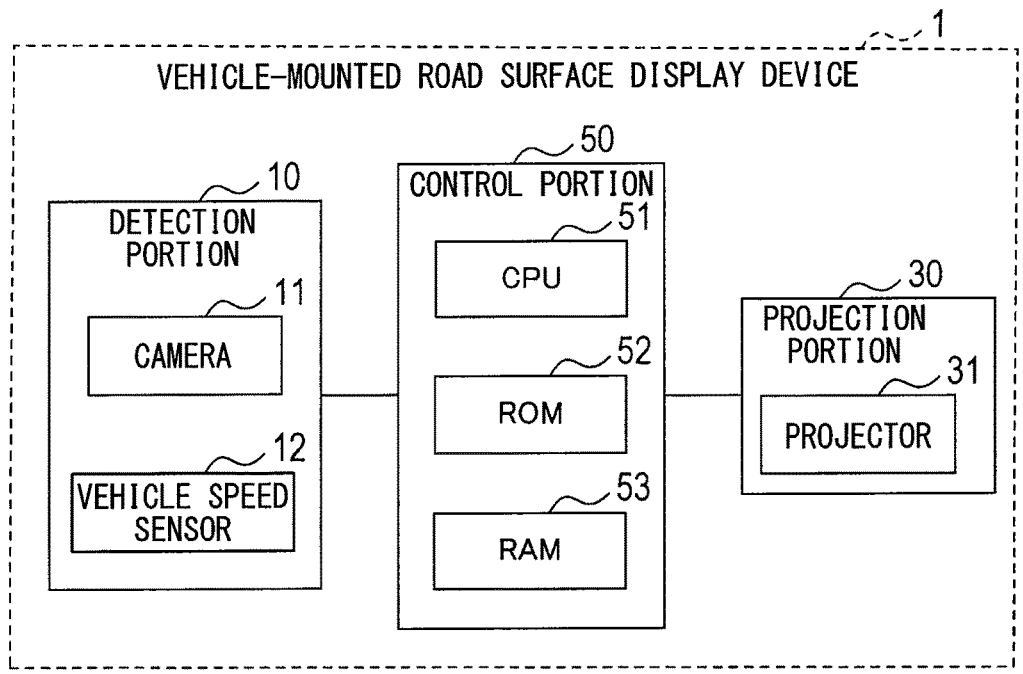
FIG. 1 is a block diagram showing a configuration of a vehicle-mounted road surface display device according to one embodiment of the present disclosure.

A vehicle-mounted road surface display device 1 shown in FIG. 1 as an example is mounted to a vehicle, and displays an image on a road surface. The vehicle-mounted road surface display device 1 includes a vehicle state detection portion 10, a projection portion 30, and a control portion 50.

The detection portion 10 includes a camera 11 and a vehicle speed sensor 12 as an example.

The camera 11 is provided to a front side of a vehicle equipped with the vehicle-mounted road surface display device 1 (hereinafter, referred to as an own vehicle) and repetitively captures an image of a ground surface ahead of the own vehicle, that is, a road surface of a road ahead of the own vehicle. The camera 11 captures color images. The camera 11 outputs captured image data, which is image data representing a captured image, to the control portion 50.

The vehicle speed sensor 12 generates a vehicle speed signal according to a rotation of an axle, and detects a vehicle speed of the own vehicle according to the vehicle speed signal. The vehicle speed sensor 12 outputs a detected vehicle speed to the control portion 50.

The projection portion 30 includes a projector 31 as an example. Upon input of image data to display a projection image described below (hereinafter, referred to as projection image data) from the control portion 50, the projector 31 displays a color image according to the projection image data. The projector 31 is disposed on the front side of the own vehicle such that the image is projected on a surface of a road ahead of the own vehicle. Hereinafter, an image projected on a road surface by the projector 31 is referred to as a projection image.

The following will describe a projection image projected onto a road surface by the projector 31 according to the projection image data inputted from the control portion 50. A projection image includes multiple sub images indicating expected arrival zones at which an own vehicle 7 is expected to arrive when respective predetermined expected arrival durations elapse. The multiple sub images are arranged according to the expected arrival times.

An example of a projection image will now be described according to FIG. 2.

In the present embodiment, as an example, three expected arrival periods are set in advance. The three expected arrival periods include a braking disabled period, a hard braking period, and a braking enabled period. Images representing expected arrival zones at which the own vehicle 7 is expected to arrive are displayed in different manners corresponding to respective expected arrival periods as a whole projection image. Herein, "displayed in different manners" means that visual effects of the elements, for example, colors and patterns are different.

Figure 2:
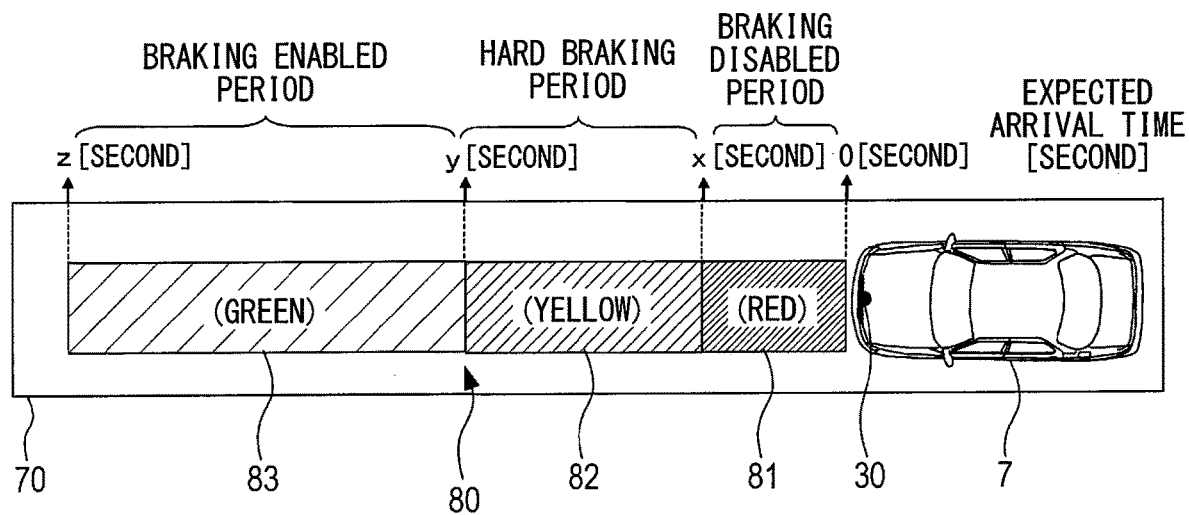
FIG. 2 is a view showing an example of a projection image.

In the present embodiment, as is shown in FIG. 2, a present location of the own vehicle 7 is set to a starting point, that is, a provisional time at the present location of the own vehicle 7 is set to 0 (sec). A period from the start point to a predetermined first set time point x (sec) is defined as the braking disabled period. A period from the first set time point x (sec) to a predetermined second set time point y (sec) is defined as the hard braking period. A period from the second set time point y (sec) to a third set time point z (sec) is defined as the braking enabled period (herein, x<y<z).

The braking disabled period (0 to x (sec)) is set in such a manner that the own vehicle 7 is incapable of avoiding an obstacle, such as a pedestrian, present in an expected arrival zone at which the own vehicle 7 is expected to arrive within the braking disabled period even though the own vehicle 7 performs a hard braking operation or a hard steering operation.

The hard braking period (x to y (sec)) is set in such a manner that the own vehicle 7 is capable of avoiding an obstacle, such as a pedestrian, present in an expected arrival zone at which the own vehicle 7 is expected to arrive within the hard braking period when the own vehicle 7 performs a hard braking operation or a hard steering operation.

The braking enabled period (y to z (sec)) is set in such a manner that the own vehicle 7 is capable of avoiding an obstacle, such as a pedestrian, present in an expected arrival zone at which the own vehicle 7 is expected to arrive within the braking enabled period when the own vehicle 7 performs a normal braking operation.

A projection image 80 is a band-shaped image extending in front direction of the own vehicle 7 from the present location of the own vehicle 7 set as the starting point on a road surface 70 of a road ahead of the own vehicle 7, and includes multiple band-shaped sub images arranged corresponding to the three expected arrival time points described above and displayed in three different colors of red, yellow, and green, from a side closer to the own vehicle 7.

A range where a red band-shaped image 81 is disposed corresponds to an expected arrival zone at which the own vehicle 7 is expected to arrive within the braking disabled period (0 to x (sec)). In other words, the range where the red band-shaped image 81 is disposed on the road surface 70 is a zone having the highest risk for a viewer, such as a pedestrian, in an entire range occupied by the projection image 80 on the road surface 70. Since a collision with a pedestrian is highly likely to occur in this zone, this zone also has a high risk for an occupant in the own vehicle.

A range where a yellow band-shaped image 82 is disposed corresponds to an expected arrival zone at which the own vehicle 7 is expected to arrive within the hard braking period (x to y (sec)). In other words, the range where the yellow band-shaped image 82 is disposed on the road surface 70 is a zone having the second highest risk for a viewer, such as a pedestrian, in the entire range occupied by the projection image 80 on the road surface 70. Since the occupant of the own vehicle may suffer an impact for avoiding a collision with a pedestrian by a hard braking operation or a hard steering operation, this zone also has a risk for an occupant in the own vehicle.

A range where a green band-shaped image 83 is disposed corresponds to an expected arrival zone at which the own vehicle 7 is expected to arrive within the braking enabled period (y to z (sec)). In other words, the range where the green band-shaped image 83 is disposed on the road surface 70 is a zone having the third highest risk for a viewer, such as a pedestrian, that is, a safest zone for a viewer, such as a pedestrian, in the entire range occupied by the projection image 80 on the road surface 70. It is also the safest zone for an occupant in the own vehicle.

In short, the projection image 80 indicates, to a viewer, such as a pedestrian, a safety level of a road ahead of the own vehicle 7 in a travel direction. In the present embodiment, the projection image 80 is projected onto a road surface by the projector 31. Thus, a pedestrian is enabled to determine a safety level of the road based on the projection image 80.

Referring to FIG. 1 again, the control portion 50 includes a known micro-computer having a CPU 51, a ROM 52, a RAM 53, and so on. The control portion 50 performs a process to implement various functions according to programs preliminarily stored in the ROM 52. The control portion 50 performs a road surface display process described below as an example.

Figure 3:
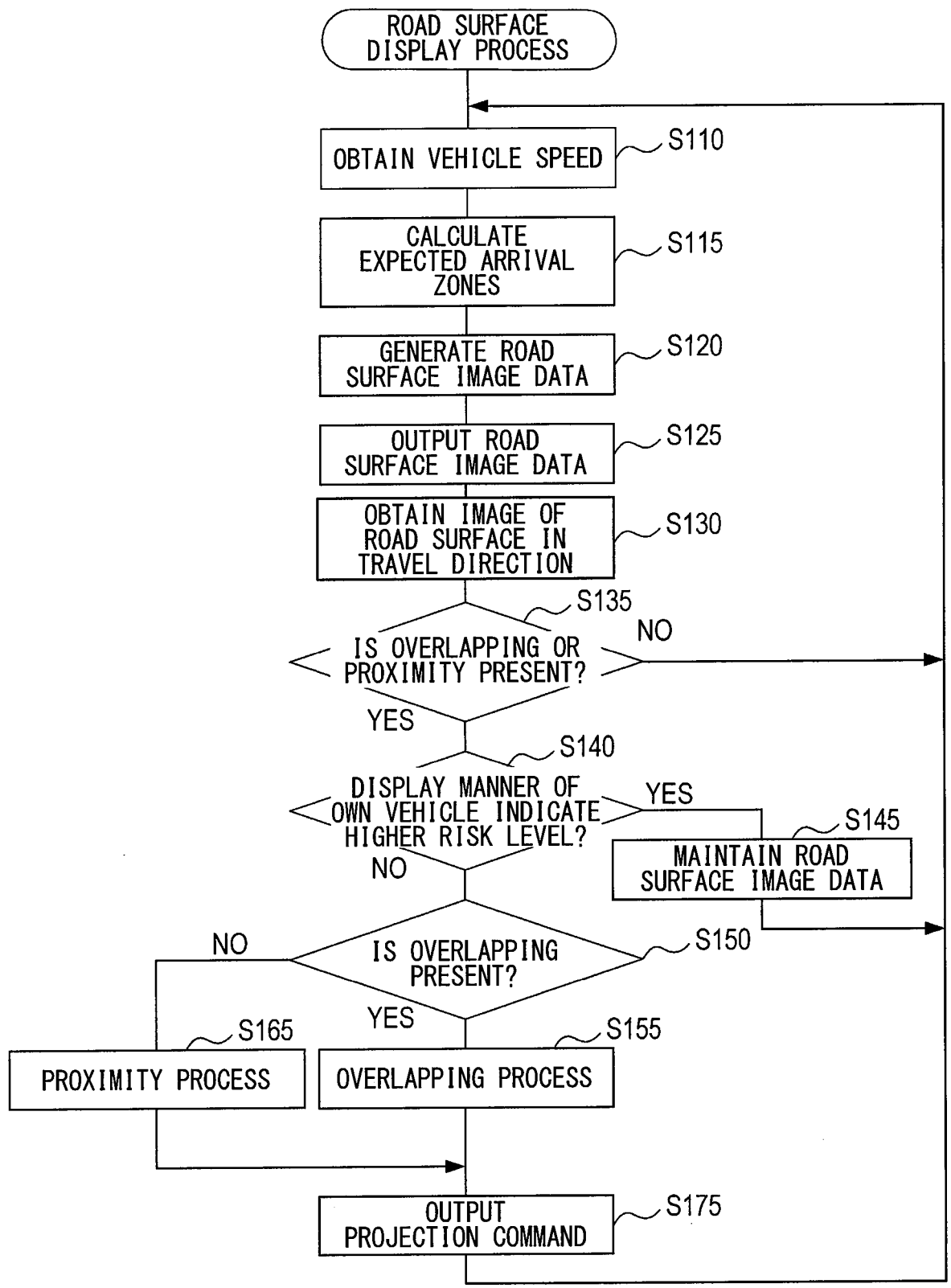
FIG. 3 is a flowchart showing one example of a road surface display process.

The road surface display process performed by the CPU 51 will now be described using a flowchart of FIG. 3. By executing the road surface display process, the CPU 51 generates projection image data of the projection image 80 described above and projects the projection image 80 onto the road surface 70 using the projection portion 30 (projector 31). The road surface display process is repetitively performed while an ACC switch is ON. Operations described in the following are executed by the CPU 51 unless specified otherwise.

Firstly, a vehicle speed of the own vehicle 7 is obtained in S(Step) 110.

In S115, the expected arrival zones at which the own vehicle 7 is expected to arrive within the braking disabled period, the hard braking period, and the braking enabled period described above are calculated according to the vehicle speed of the own vehicle 7 obtained in S110. The expected arrival zones are indicated by distances (m) over which the own vehicle 7 travels within the braking disabled period, the hard braking period, and the braking enabled period. To be more specific, values of the braking disabled period, the hard braking period, and the braking enabled period are preliminarily recorded in the ROM 52. In S115, the values of the braking disabled period, the hard braking period, and the braking enabled period are obtained from the ROM 52, and products of the respective obtained values and the vehicle speed of the own vehicle 7 obtained in S110 are calculated as the expected arrival zones of the respective periods.

In S120, projection image data to display the projection image 80 is generated according to the expected arrival zones calculated in S115. More specifically, the projection image data is generated in such a manner that a red band-shaped image is disposed in the expected arrival zone corresponding to the braking disabled period, a yellow band-shaped image is disposed in the expected arrival zone corresponding to the hard braking period, and a green band-shaped image is disposed in the expected arrival zone corresponding to the braking enabled period, in the entire range occupied by the projection image 80 on the road surface 70 as described above.

In S125, the projection image data generated in S120 is outputted to the projection portion 30 (projector 31). The projection image 80 corresponding to the projection image data is displayed on the road surface 70 by the projection portion 30.

In S130, captured image data representing a captured image of the road surface 70 of the road ahead of the own vehicle 7 is acquired.

In S135, presence or absence of overlapping or proximity in the projection image on the road surface 70 of the road ahead of the own vehicle 7 is determined according to the captured image data acquired in S130.

The presence of overlapping in the projection image on the road surface 70 of the road ahead of the own vehicle 7 means a state in which an image projected by another vehicle overlaps an image projected by the own vehicle. The image projected by the own vehicle is the projection image 80 displayed by the own vehicle 7 on the road surface 70 of the road ahead of the own vehicle 7 in the travel direction. The image projected by another vehicle is a projection image 80 displayed by another vehicle equipped with the vehicle-mounted road surface display device 1.

When overlapping occurs, a display color of the image projected by the own vehicle and a display color of the image projected by another vehicle are simultaneously displayed in the overlapping zone. Hence, when display color of the image projected by the own vehicle is different from display color of the image projected by another vehicle, a mixed color of the respective display colors is displayed on the road surface. That is, when overlapping occurs, a pedestrian who sees the projection image in the overlapping zone may fail to correctly determine a safety level of the road based on the display color.

Meanwhile, the presence of proximity in the projection images on the road surface 70 of the road ahead of the own vehicle 7 means a state in which multiple projection images, namely the image projected by the own vehicle and the image projected by another vehicle are displayed next to each other with a space less than a predetermined proximity threshold value on the road surface 70 of the road ahead of the own vehicle 7. Such a state may occur, for example, when the own vehicle and another vehicle as a vehicle coming in an opposite direction are present in a narrow road.

When the proximity of the projection images occurs, projection images projected by multiple vehicles are visible to a pedestrian who sees the road surface 70 in a region where the proximity occurs. Hence, when display color of the image projected by the own vehicle is different from display color of the image projected by another vehicle, multiple different display colors are visible to the pedestrian. That is, when the proximity of the projection images occurs, a pedestrian who sees the projection images displayed in the proximity occurrence range may fail to correctly determine a safety level of the road based on the display color.

Regarding the above-described difficulties, the presence of overlapping and the presence of proximity between the image projected by the own vehicle and the image projected by another vehicle are detected in S135 based on the display states obtained from the captured image data acquired in S130. The display states include projected image positions on the road surface 70, that is, the position of the image projected by the own vehicle on the road surface 70 of the road ahead of the own vehicle 7 in the travel direction and the position of the image projected by another vehicle on the road surface 70 of the road ahead of the own vehicle 7 in the travel direction.

More specifically, in an image shown by the captured image data acquired in S130, when a zone is displayed in a color other than red, yellow, and green within a range where the image projected by the own vehicle is displayed, the presence of overlapping is determined. The presence of proximity is determined when a projection image displayed in at least one of red, yellow, and green is present substantially next to a range in which the image projected by the own vehicle is displayed with a space less than the proximity threshold value in the image shown by the captured image data acquired in S130. When overlapping or proximity occurs, advancement is made to S140. When neither overlapping nor proximity is present, the flow returns to S110. When the imaged projected by another vehicle is not included in the image shown by the captured image data acquired in S130, the flow returns to S110.

In S140 to which advancement is made when the presence of overlapping or proximity is determined, a determination is made as to whether a display manner of the image projected by the own vehicle indicates a higher risk than a display manner of the image projected by another vehicle in the overlapping zone or in a range where proximity is present. More specifically, a display color of the image projected by the own vehicle and a display color of image projected by another vehicle are compared with each other. Herein, red indicates highest risk, sequentially followed by yellow and green.

Figure 4:
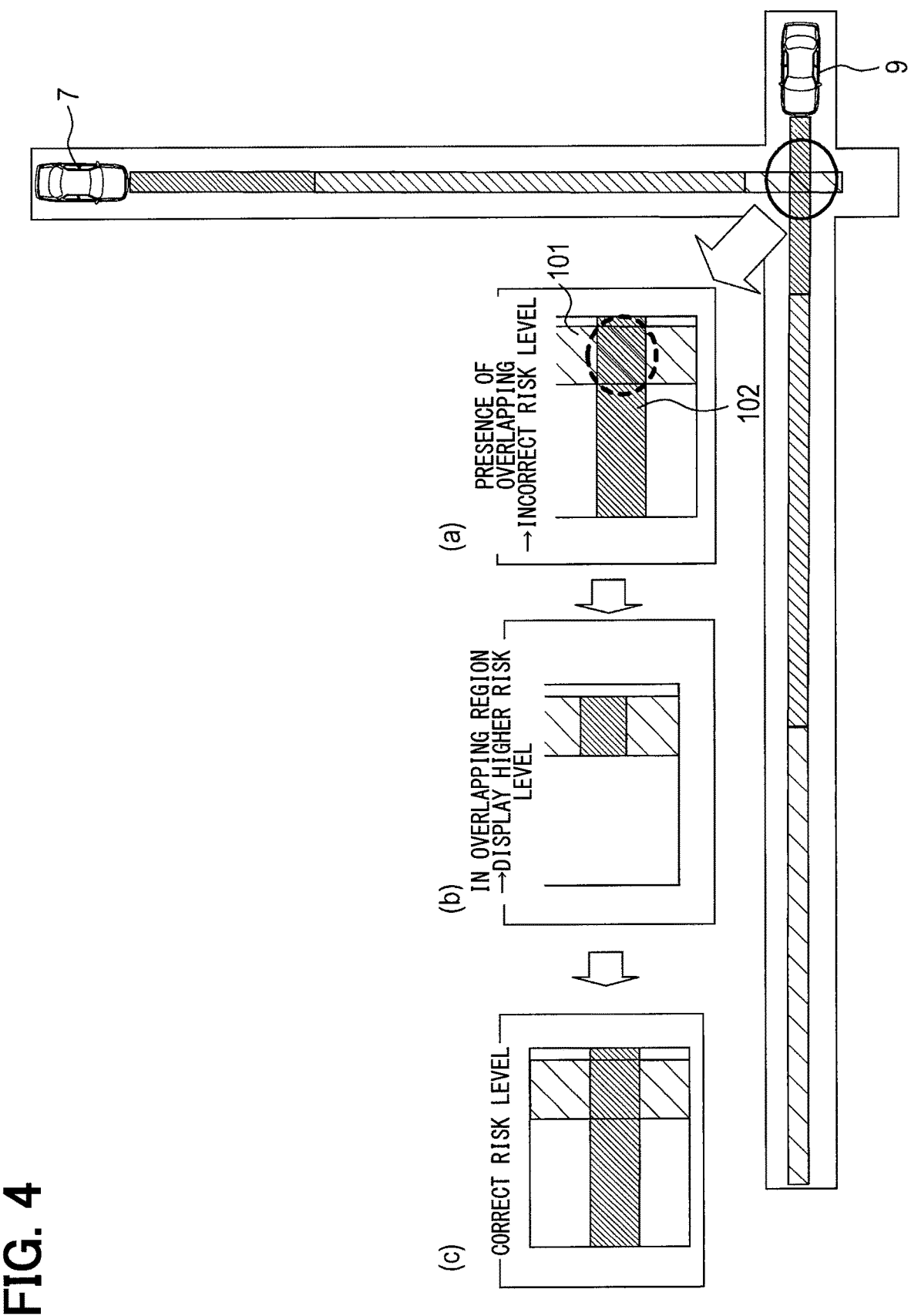
FIG. 4 is a view showing an example of an overlapping process.

In a case where advancement is made to S140 because the presence of overlapping is determined in S135, as is shown in a case (a) of FIG. 4 as an example, a color of a zone 101 of the image projected by the own vehicle in a portion other than an overlapping region and adjacent to the overlapping region is compared with a color of a zone 102 of image projected by another vehicle in a portion other than the overlapping region and adjacent to the overlapping region in the image shown by the captured image data acquired in S130.

Figure 5:
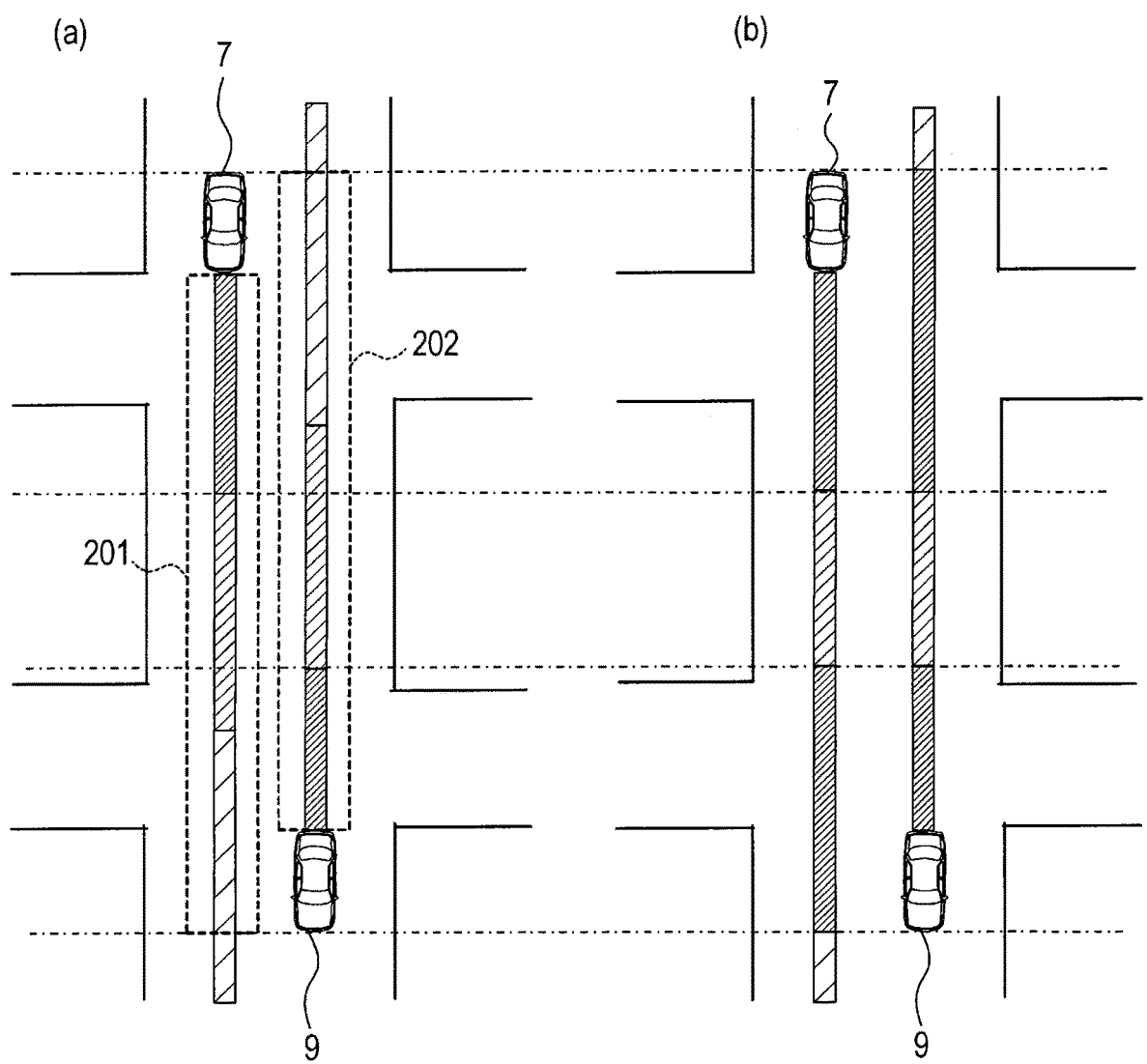
FIG. 5 is a view showing an example of a proximity process.

Meanwhile, in a case where advancement is made to S140 because the presence of proximity is determined in S135, as is shown in a case (a) of FIG. 5, colors of the image projected by the own vehicle in a range 201 where the proximity is present are compared with colors of image projected by another vehicle in a range 202 where the proximity is present in the image shown by the captured image data acquired in S130.

When it is determined that a display manner of the image projected by the own vehicle indicates higher risk than a display manner of image projected by another vehicle, advancement is made to S145. When it is determined to the contrary (the image projected by the own vehicle indicates lower risk), advancement is made to S150.

In S145 to which advancement is made because higher risk is determined in S140, projection image data same as the projection image data generated in S125 is continuously outputted to the projection portion 30. An image same as the projection image 80 shown in FIG. 2 is thus continuously displayed on the road surface 70.

In S150 to which advancement is made because lower risk is determined in S140, a determination is made as to whether the presence of overlapping is determined in S135, that is, whether it is the presence of overlapping or the presence of proximity that has been determined in S135. When the presence of overlapping is determined, advancement is made to S155. When the absence of overlapping, that is, the presence of proximity is determined, advancement is made to S165.

In S155, an overlapping process is performed. Herein, projection image data is adjusted from a case shown in (a) of FIG. 4 to a case shown in (b) of FIG. 4 as an example. More specifically, the projection image data is adjusted not to display a color of the image projected by the own vehicle but to display a color of the image projected by another vehicle in a region where the presence of overlapping between the image projected by another vehicle 9 and the image projected by the own vehicle 7 is detected on the road surface 70.

In S165, a proximity process is performed. Herein, projection image data is adjusted from a state (a) of FIG. 5 to a state (b) of FIG. 5 as an example. More specifically, the projection image data is adjusted not to display a color of the image projected by the own vehicle but to display a color of image projected by another vehicle in a region where the presence of proximity of the image projected by another vehicle 9 and the image projected by the own vehicle 7 is detected on the road surface 70.

In the present embodiment, as is shown in the state (b) of FIG. 5, when a color of the image projected by another vehicle is red in the region where the presence of proximity is detected, the projection image data of the image projected by the own vehicle is adjusted not to display a color of the image projected by the own vehicle but display a color of image projected by another vehicle in a region in close proximity to another vehicle 9 in addition to the region in close proximity to the red image projected by another vehicle 9. The example shown in the state (b) of FIG. 5 is a case where the projection image data is also adjusted in the same manner in another vehicle 9 which is equipped with the vehicle-mounted road surface display device 1.

In S175, the projection image data generated in S155 or S165 is outputted to the projection portion 30 (projector 31). Hence, one of the projection images projected by another vehicle or the own vehicle which indicates the shorter expected arrival time is displayed in the region where the overlapping is present (a case (c) of FIG. 4). Similarly, one of the projection images projected by another vehicle or the own vehicle which indicates the shorter expected arrival time is displayed in the region where the proximity is present (the state (b) of FIG. 5).

According to the road surface display process, a projection image including multiple sub images generated for predetermined expected arrival times to specify expected arrival zones at which the own vehicle is expected to arrive when the respective expected arrival times elapse is displayed on the road surface 70. When a projection image projected by other vehicles overlaps with or is in close proximity to a projection image projected by the own vehicle, one of the projection images which indicates the shortest expected arrival time is displayed on the road surface.

An effect as follows can be obtained by the embodiment described in detail as above.

When a projection image (corresponding to a different vehicle image) projected by another vehicle overlaps or is in close proximity to a projection image 80 (corresponding to an own vehicle image) projected by the own vehicle 7, one of the projection images which indicates the shorter expected arrival time is displayed on the road surface. Hence, only one type of the projection image indicating a clear safety level is displayed on the road surface 70. A viewer, such as a pedestrian, is thus enabled to correctly determine a safety level of the road according to the displayed projection image.

More specifically, when an image projected by another vehicle 9 indicates a shorter arrival time than the image projected by the own vehicle in a region where overlapping occurs, a color of the overlapping zone may be changed to a color of the image projected by another vehicle 9. Assume that, as is shown in a state (a) of FIG. 6, images in different colors each indicating a safety level of the road are displayed by the own vehicle and another vehicle in an overlapping region where the presence of overlapping is detected. Then, a pedestrian who sees the displayed images may feel that a safety level of the road is not clearly indicated.

Figure 6:
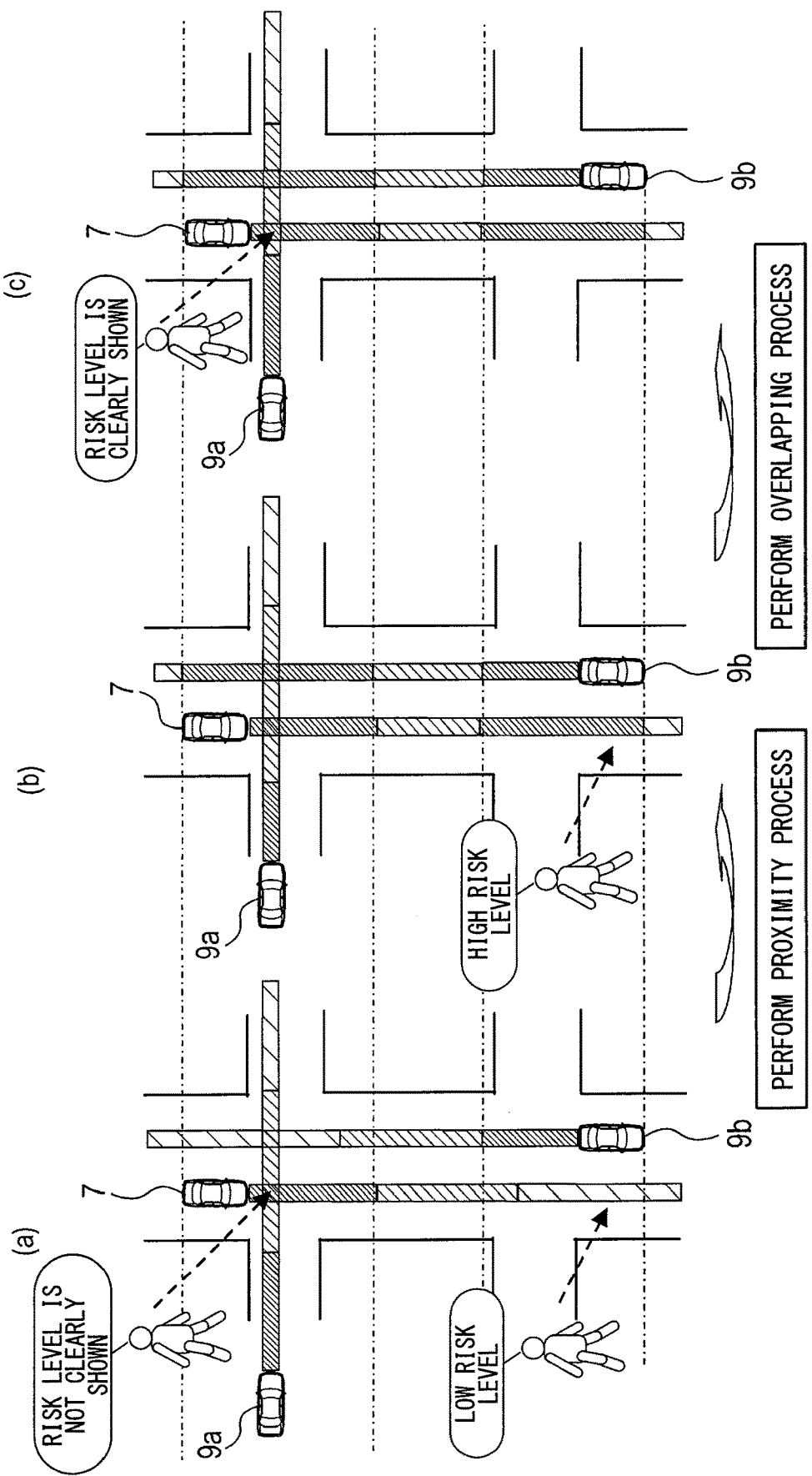
FIG. 6 is a view showing an effect by the proximity process and the overlapping process.

By contrast, in the present embodiment, as is shown in a state (c) of FIG. 6, the image projected by the own vehicle and the image projected by another vehicle are displayed in a single color of the higher risk to indicate a same safety level. A pedestrian is thus enabled to correctly determine a safety level of the road according to the color of the displayed projection image.

Meanwhile, when an image projected by another vehicle 9 indicates a shorter arrival time than the image projected by the own vehicle in a region where proximity occurs, a color of the region where proximity occurs may be changed to a color of the image projected by another vehicle 9. When the image projected by the own vehicle indicates a longer arrival time than an image projected by another vehicle, a color of the overlapping zone is changed to a color of the image projected by another vehicle. Assume that, as is shown in state (a) of FIG. 6, multiple images each indicating a safety level of the road in a different manner (for example, a color) are displayed close to each other by the own vehicle and another vehicle in a range where the presence of proximity is detected. Then, a pedestrian who sees the display closer to the pedestrian may make an incorrect determination that, for example, the road is at low risk.

By contrast, according to the present embodiment, as is shown in a state (b) of FIG. 6, projection images are displayed in a color of the higher risk to indicate a same safety level by controlling the image projected by the own vehicle and the image projected by another vehicle. A pedestrian who sees the projection images is thus enabled to correctly determine a safety level of the road that, for example, whether the road has high risk.

Herein, the control portion 50 corresponds to an example of a road surface display device, S125 corresponds to an example of process as a road surface image control portion, S135 corresponds to an example of process as a detection portion, and S155 and S165 correspond to an example of process as a display adjustment portion. Also, a set of the projection image data generated by the control portion 50 and projection images 80 projected onto the road surface 70 according to the projection image data by the projection portion 30 corresponds to a road surface image.

Other Embodiments

While the above has described one embodiment of the present disclosure, it should be appreciated that the present disclosure is not limited to the embodiment above and can be modified in various manners.

Figure 7:
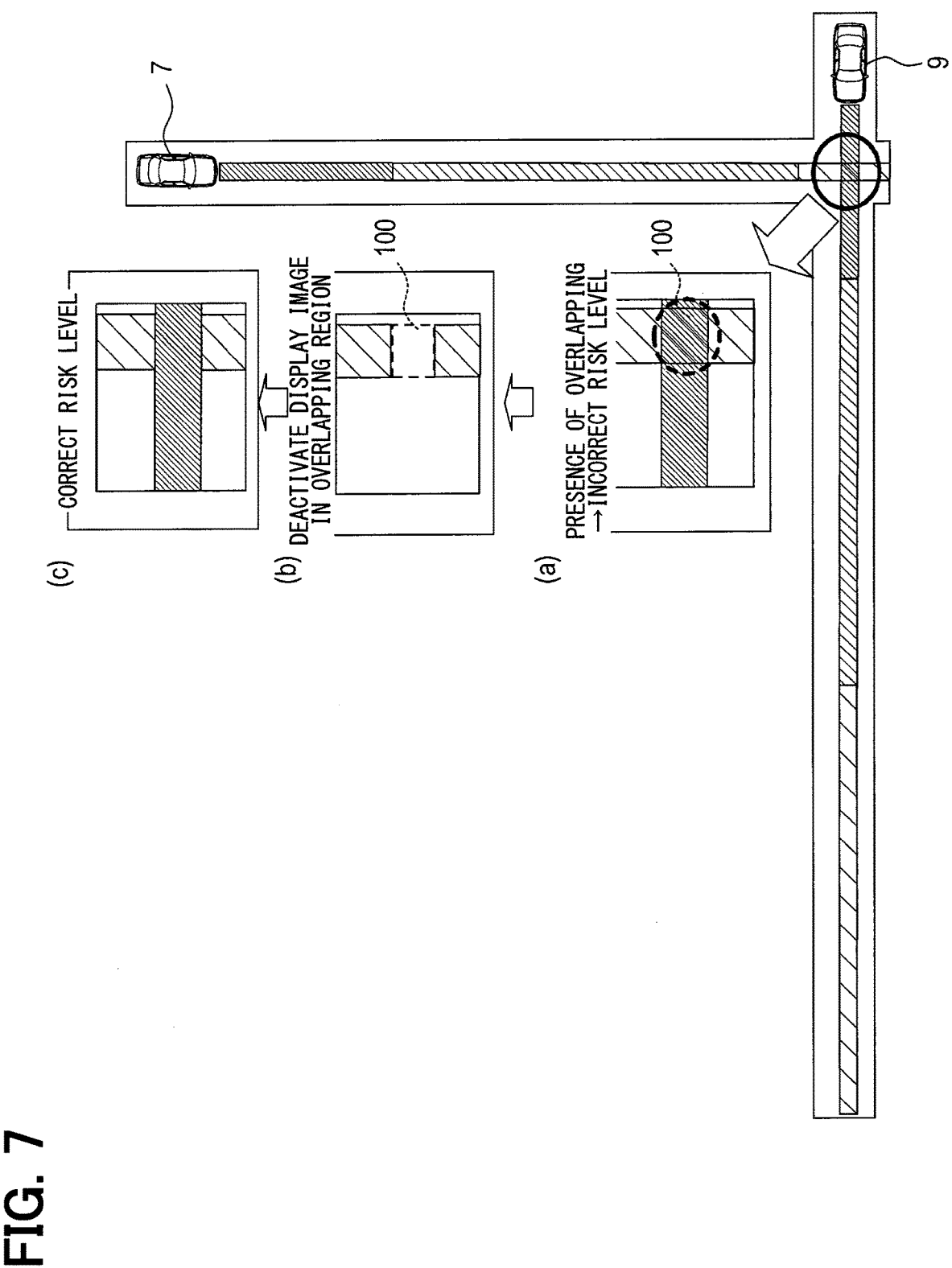
FIG. 7 is a view showing another example of the overlapping process.

In the embodiment above, the projection image data is adjusted not to display a color of the image projected by the own vehicle but to display a color of the image projected by another vehicle in a region where overlapping is detected by the overlapping process (S155) in the road surface display process. However, the overlapping process is not limited to the process described above. For instance, projection image data may be adjusted from a state (a) of FIG. 7 to a state (b) of FIG. 7 as an example. That is, a part of an image projected by the own vehicle may be not shown by deactivating an image display in a region 100 where overlapping of the image projected by another vehicle 9 on an image projected by the own vehicle 7 is detected on a road surface 70. Even when configured as above, one of the projection images projected by another vehicle or projected by the own vehicle which indicates the shorter expected arrival time is displayed in the region where the overlapping is present (a state (c) of FIG. 7). Hence, an effect same as the effect of the embodiment above can be obtained.

In the embodiment above, an image corresponding to the braking disabled period in the projection image 80 is displayed in red. However, the present disclosure is not limited to the configuration as above. The image may be displayed in any suitable manner to warn a pedestrian a region at highest risk. Likewise, an image corresponding to the hard braking period in the projection image 80 is not necessarily displayed in yellow. The image may be displayed in any suitable manner to alert a pedestrian. An image corresponding to the braking enabled period in the projection image 80 is not necessarily displayed in green, either. The display may be displayed in any suitable manner to inform a pedestrian of safeness.

Figure 8:
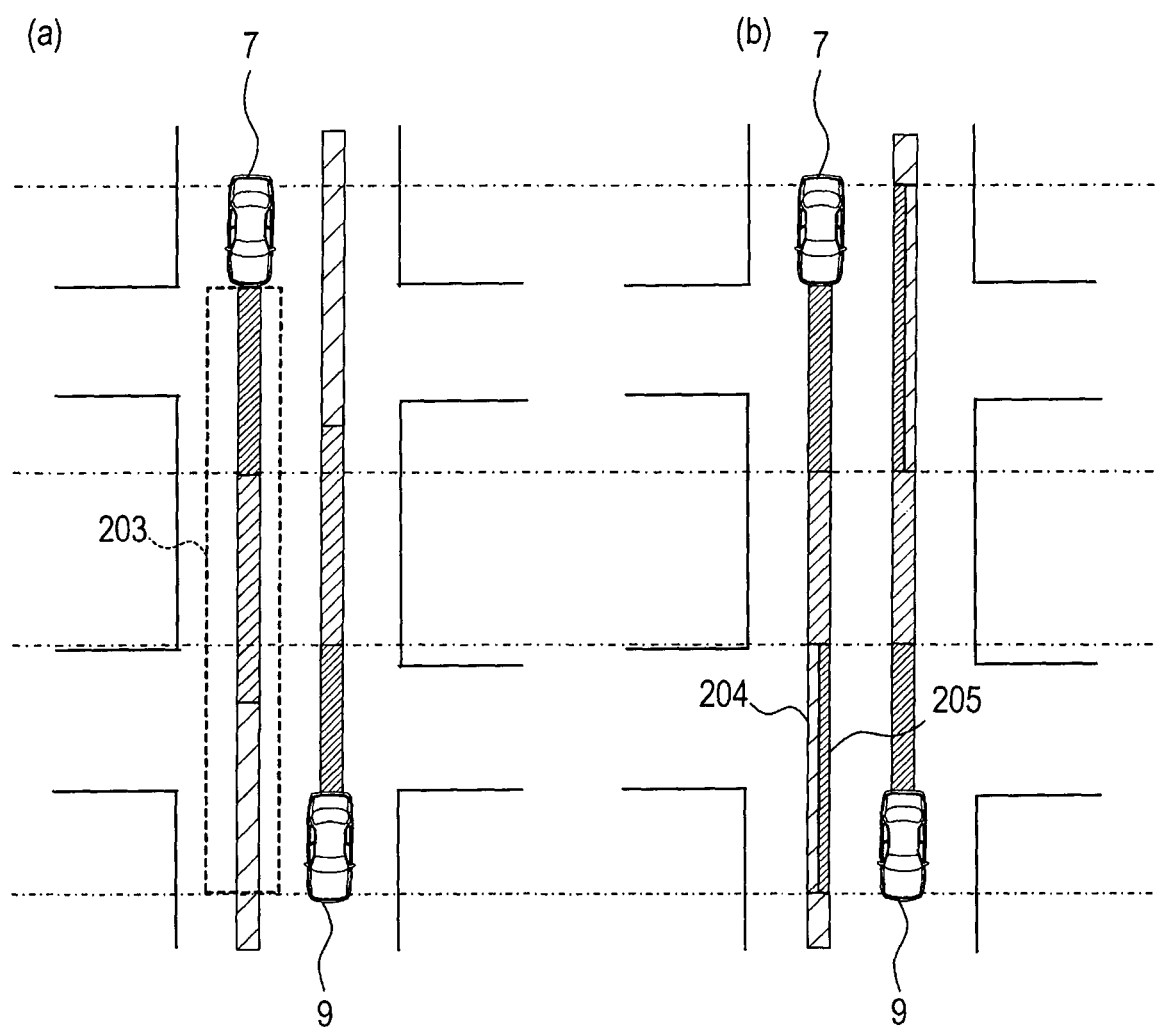
FIG. 8 is a view showing another example of the proximity process.

In the embodiment above, the projection image data is adjusted not to display a color of the image projected by the own vehicle but to display a color of image projected by another vehicle in a region where the presence of proximity is detected by the proximity process (S165) in the road surface display process. However, the proximity process is not limited to the process as above. For instance, the projection image data may be adjusted from a state (a) of FIG. 8 to a state (b) of FIG. 8 as an example. That is, when proximity of the image projected by another vehicle 9 to an image projected by the own vehicle 7 is detected on a road surface 70, an image 204 projected by the own vehicle and an image 205 projected by another vehicle are displayed close to each other in a region 203 where the presence of proximity is detected. When configured as above, a pedestrian who sees the projection image is alerted to a road on which the projection image is displayed.

Functions furnished to a single component in the embodiment above may be allocated to multiple components or functions furnished to multiple components may be intensively allocated to a single component. Components of the embodiment above may be omitted in part to an extent that the object is achieved.

Besides the vehicle-mounted road surface display device 1 and the control portion 50 described above, the present disclosure may be realized in various forms, such as a program causing the control portion 50 to operate in the above-described operation, a medium storing the program, and a road surface display method.

While the disclosure has been described with reference to preferred embodiments thereof, it is to be understood that the disclosure is not limited to the preferred embodiments and constructions. The disclosure is intended to cover various modification and equivalent arrangements. In addition, the various combinations and configurations, which are preferred, other combinations and configurations, including more, less or only a single element, are also within the spirit and scope of the disclosure.

The invention claimed is:

1. A road surface display device, which is mounted to an own vehicle and displays an image on a road surface, comprising:
   a control portion generating a road surface image including sub images, each of the sub images indicating an expected arrival zone where the own vehicle is expected to arrive at a corresponding predetermined expected arrival time, the sub images being arranged according to the respective expected arrival times, and the control portion displaying the road surface image on a road surface ahead of the own vehicle in a travel direction; and
   a detection portion obtaining display states of a different vehicle image and an own vehicle image when the different vehicle image and the own vehicle image are displayed on the road surface, the different vehicle image being a road surface image displayed by a different vehicle equipped with the road surface display device, the own vehicle image being the road surface image displayed by the own vehicle, and the detection portion detecting a presence of overlapping or a presence of proximity between the different vehicle image and the own vehicle image based on the obtained display states, wherein the control portion, when the presence of overlapping or the presence of proximity is detected by the detection portion, adjusts an output of to display one of the different vehicle image or the own vehicle image which indicates a shorter expected arrival time in a region where the presence of overlapping or the presence of proximity is detected on the road surface.

2. The road surface display device according to claim 1, wherein,
when the presence of overlapping is detected by the detection portion and the different vehicle image indicates the shorter expected arrival time than the own vehicle image, the control portion displays the own vehicle image in a same manner as the different vehicle image at least in the region where the presence of overlapping is detected on the road surface.

3. The road surface display device according to claim 1, wherein,
when the presence of overlapping is detected by the detection portion and the different vehicle image indicates the shorter expected arrival time than the own vehicle image, the control portion deactivates a display of the own vehicle image in the region where the presence of overlapping is detected on the road surface.

4. The road surface display device according to claim 1, wherein,
when the presence of proximity is detected by the detection portion and the different vehicle image indicates the shorter expected arrival time than the own vehicle image, the control portion displays the own vehicle image in a same manner as the different vehicle image at least in the region where the presence of proximity is detected on the road surface.

5. A road surface display device, which is mounted to an own vehicle and displays an image on a road surface, comprising:

a control portion generating a road surface image including sub images, each of the sub images indicating an expected arrival zone where the own vehicle is expected to arrive at a corresponding predetermined expected arrival time, the sub images being arranged according to the respective expected arrival times, the control portion displaying the road surface image on a road surface ahead of the own vehicle in a travel direction, and the control portion displaying the sub images corresponding to respective expected arrival times in different manners; and a detection portion obtaining display states of a different vehicle image and an own vehicle image when the different vehicle image and the own vehicle image are displayed on the road surface, the different vehicle image being a road surface image displayed by a different vehicle equipped with the road surface display device, the own vehicle image being the road surface image displayed by the own vehicle, and the detection portion detecting a presence of overlapping or a presence of proximity between one of the sub images of the different vehicle image and one of the sub images of the own vehicle image based on the obtained display states, wherein the control portion, when the presence of overlapping or the presence of proximity is detected by the detection portion, adjusts an output to display the one of the sub images of the different vehicle image or the one of the sub images of the own vehicle image which indicates a shorter expected arrival time in a region where the presence of overlapping or the presence of proximity is detected on the road surface.

* * * * *